United States Patent Office 3,312,662
Patented Apr. 4, 1967

---

3,312,662
CATALYTIC PROCESS FOR PREPARING POLY-CARBONATES BY SELF-CONDENSATION OF BISPHENOL DICHLOROFORMATE
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,675
10 Claims. (Cl. 260—47)

The present invention relates in general to the preparation of polycarbonate resins, and more particularly to a novel catalytic process for preparing polycarbonates from dihydric phenol dichloroformates.

A variety of techniques have heretofore been proposed for preparing polycarbonate resins. In the main these various processes are conveniently categorized as being either (a) direct phosgenation or (b) ester interchange.

According to the direct phosgenation procedure it is conventional practice to dissolve or suspend a dihydric phenol in an aqueous solution of a stoichiometric excess of sodium hydroxide and an inert organic solvent, and then to phosgenate the dihydric phenol by bubbling phosgene into the mixture while maintaining the reaction system at a temperature of about 20° C. to about 30° C. The immediate result of the phosgenation step is the production of a reaction mass consisting of an inorganic phase containing water, unreacted alkali and by-product salts of the reaction, and an organic phase which is a viscous solution of low molecular weight polycarbonates in the solvent employed. By prolonged stirring in the presence of unused alkali this intermediate, low molecular weight polymer is "bodied" or further polymerized into a high molecular weight polycarbonate resin.

According to the ester interchange procedure, polycarbonates are prepared by the interaction in the molten state of a diaryl carbonate and a dihydric phenol, advantageously carried out under a reduced pressure to facilitate removal of volatile reaction by-products. As the reaction proceeds, the reaction mass becomes increasingly viscous thereby making the removal of reaction by-products increasingly difficult. As a result, unless considerable effort is expended, the final polycarbonate product contains a significant amount of undesirable impurities.

The direct phosgenation method, because of the presence of considerable quantities of diluent materials and because the reaction by-products are inorganic salts, does not present the same difficulty in polymer purification as the ester interchange method. The presence of a strong caustic solution does, however, tend to promote a competing polymer degradation reaction which can be minimized only by the most careful control of the pH of the reaction system.

It is therefore the general object of the present invention to provide a process for preparing polycarbonate resins which avoids the disadvantages of the prior known methods.

It is a more particular object to provide an anhydrous process for preparing polycarbonates which is more economical, avoids undesirable side-reactions, and which presents no difficulty in obtaining a final polymer product free of contaminants.

These and other objects which will be obvious from the description appearing hereinafter are accomplished by the method of the present invention which comprises heating within a critical temperature range a dihydric phenol dichloroformate in contact with a catalytic amount of a magnesium halide having the general formula:

(I) 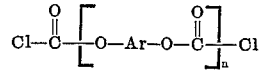

wherein X is fluorine, chlorine, bromine, or iodine. Preferably X is chlorine.

The aryl dichloroformates suitably employed in the process of this invention have the general formula:

(II) 
$$Cl-\overset{O}{\underset{\|}{C}}\left[-O-Ar-O-\overset{O}{\underset{\|}{C}}\right]_n-Cl$$

wherein $n$ is an integer having a value of from 1 to about 15 and Ar represents the aromatic hydrocarbon residue of a dihydric phenol, i.e., the divalent moiety which remains after schematically splitting off both hydroxyl groups from a dihydric phenol free of groups reactive in the system herein employed such as amine and carboxyl, and sulphydryl.

The dichloroformates of any of the dihydric phenols heretofore employed in any of the prior known polycarbonate processes are suitable for use in this invention. Such dichloroformates are usually defined as being mononuclear or polynuclear compounds in which the two

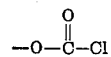

groups are directly attached to different carbon atoms of the same or different aromatic nuclei. The class of suitable aryl dichloroformates is quite large and includes the dichloroformate derivatives of the phenol compounds described in U.S. Patent 2,950,266—Goldblum and U.S. Patent 2,964,797—Peilstöcker et al. corresponding to the general formula:

(III) 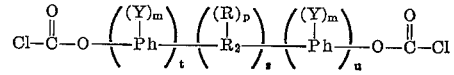

wherein the radical

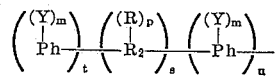

is equivalent to —Ar— in Formula II above and wherein R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isomalyidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethylsiloxy, polydiphenylsiloxy, polymethylphenyl siloxy, etc., or and ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ph is the residue of an aromatic nucleus, Y is a substituent selected from the group consisting of (a) inorganic atoms, (b) inorganic radicals, and (c) organic radicals, (a), (b), and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dichloroformate compound, the substituent Y may be the same or different, as may be the R. Among the substituents represents by Y are halogen e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula III, the aromatic nuclei are directly joined with no intervening alkylene or alkylidene or other bridge. The positions of the chloroformate groups and Y on the aromatic nuclear residues Ph can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of aryl dichloroformates that may be employed in this invention include the dichloroformate derivatives of 2,2-bis-(4-hydroxyphenyl)-propane (Bisphenol-A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-(phenyl)-ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxyphenyls such as 4,4'-dihydroxydiphenyl; 2,2'-dihydroxyphenyl; 2,4'-dihydroxyphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 5'-chloro-2',4-dihydroxydiphenyl sulfone; 3'-chloro-4,4'-dihydroxydiphenyl sulfone; bis-(4-hydroxy phenyl)biphenyl disulfone, etc. The preparation of these and other useful sulfones is described in U.S. Patent 2,288,282—Hissman. Polysulfones as well as substituted sulfones using halogen, nitrogen alkyl radicals, etc., are also useful. Dihydroxy aromatic ethers such as p,p'-dihydroxydiphenyl ether; the 4,3'-, 4,2'-, 3,3'-, 2,2'-, 2,3'-, etc., dihydroxydiphenyl ethers;

4,4'-dihydroxy-2,6-dimethyldiphenyl ether;
4,4'-dihydroxy-2,5'-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the aforesaid aryl dichloroformates can be used, and where $n$ in Formula II above is greater than 1, the Ar moiety need not be the same in each repeating unit. Preferably the dichloroformates are those wherein Ar is the divalent residue of gem-bis-(hydroxyphenyl) alkane in which the central alkylidene radical contains from 1 to 6 carbon atoms. Most particularly preferred is 2,2-bis(4-hydroxyphenyl)propane.

The aryl dichloroformates represented by Formula III above can readily be prepared by phosgenation of the corresponding dihydric phenols according to the method described in detail in our copending application Ser. No. 208,673 filed on the same date as the present application and since issued as U.S.P. 3,255,230.

Those aryl dichloroformates corresponding to Formula II wherein $n$ has a value of 2 or greater can be prepared by rapidly adding, preferably as a liquid, phosgene to an aqueous solution of the dialkyl metal salt of a dihydric phenol which contains a buffer such as sodium carbonate to establish a reaction system having a pH of not more than 12 and preferably from 9–11. The reaction system can also contain an inert organic diluent such as methylene chloride. Exemplary of this procedure is the disclosure of British Patent 878,115, published Sept. 27, 1961.

Concentration values for the magnesium halide catalyst is not narrowly critical but in general from about 50 to about 5000 millimole of magnesium halide per mole of dichloroformate provides adequate catalytic action. Preferably from about 50 to about 2000 millimole magnesium halide per mole of dichloroformate reactant is employed.

The inter se condensation of the dichloroformate can be suitably carried out in bulk or in a system containing an inert organic reaction medium. Typical of the numerous inert organic solvents serving as reaction media are benzene, xylene, chlorobenzene, dichlorobenzene, carbon tetrachloride, sym. tetrachloroethane, toluene, and the like.

The temperature at which the present process is carried out is critical with respect to the maximum value, but not narrowly critical with respect to the minimum value. At temperatures higher than about 250° C. the magnesium halide has been found to catalyze the destruction of the polymer product, thereby rendering the process in effect inoperable. Thus, although optimum temperature values will vary depending upon the particular dichloroformate species present in the reaction system, in no case should the temperature be allowed to exceed about 250° C. Preferably reaction temperatures are between about 50° C. and 220° C. although it will be obvious that where appreciable reaction rates result at lower temperatures with particular species, such temperatures are within the proper scope of the invention.

The present invention is more clearly understood by reference to the following examples which are merely illustrative and are not intended to be in any way limitative thereof.

EXAMPLE 1

*Preparation of the dichloroformate of 2,2-bis(4-hydroxyphenyl)propane*

In a glass reactor equipped with stirring means and a condenser system permitting the egress of HCl only from the reactor, a solution of 20 grams (0.1 mole) of 2,2-bis(4-hydroxyphenyl)propane, 0.05 mole distearyldimethylammonium chloride, and 250 ml. carbon tetrachloride is admixed with 19.8 grams of phosgene at 0° C. The resulting mixture is then heated with stirring at such a rate as to maintain a steady reflux of phosgene.

The reaction is maintained for a period of about 4 hours at a temperature of 76° C. At the end of this period, the evolution of HCl will have essentially ceased.

The product dichloroformate is isolated by filtration of the cooled reaction product followed by evaporation of the resulting filtrate. The product has a melting point of 90–91° C.

EXAMPLE 2

In a glass reactor equipped with stirrer, thermometer, and reflux condenser, a mixture of 3 grams (0.0085 mole) of the dichloroformate of 2,2-bis(4-hydroxyphenyl)propane, 0.35 gram (0.0085 mole) of magnesium chloride and 15 ml. of o-dichlorobenzene is heated at the reflux temperature of o-dichlorobenzene for 24 hours. During the heating period the liquid layer remains colorless throughout the reaction period. After cooling to room temperature the reaction mass is filtered to remove inorganic solids and the polycarbonate in the filtrate coagulated in about 150 ml. isopropanol. A high yield of a white solid polycarbonate is obtained.

EXAMPLE 3

A mixture of 2.5 grams (0.007 mole) of the dichloroformate of 2,2-bis(4-hydroxyphenyl)propane, 0.0007 mole magnesium bromide, and 5 ml. of o-dichlorobenzene is heated in an oil bath at 188° C. for 3 hours. After cooling, about 50 ml. of methylene chloride is added to the reaction mass to accomplish complete solution of the polymeric content, and the solution filtered through a celite bed prepared in chlorobenzene. The colorless filtrate is coagulated in approximately 10 times its volume of isopropanol. A white polycarbonate homopolymer of Bisphenol-A is obtained in high yield. The polymer possesses physical properties identical with a polycarbonate of comparable reduced viscosity prepared by the prior known interfacial direct phosgenation.

EXAMPLES 4–8

Using substantially the same apparatus and procedure as set forth in Example 2, a variety of polycarbonate homopolymers and copolymers are produced using different magnesium halides and solvent media. The reaction formulations are set forth in Table I below. In all examples 0.5 mole of the metal halide per mole of dichloroformate are employed.

TABLE I

| Ex. No. | Ar—(O—C(O)—Cl)₂ in which Ar is— | Metal Halide | Solvent | Polymer Product | Reaction Temp., °C. |
|---|---|---|---|---|---|
| 4 | —C₆H₄—SO₂—C₆H₄— | MgCl₂ | Carbon tetrachloride | Cl-C(O)-[O-C₆H₄-SO₂-C₆H₄-O-C(O)-]ₙ Cl, n=>60 | 76 |
| 5 | —C₆H₄—CH(H)—C₆H₄— | MgI₂ | Chlorobenzene | Cl-C(O)-[O-C₆H₄-CH(H)-C₆H₄-O-C(O)-]ₙ Cl, n=>23 | ~130 |
| 6 | —C₆H₃Cl—C(CH₃)₂—C₆H₃Cl— | MgBr₂ | Tetrachloroethane | Cl-C(O)-[O-C₆H₃Cl-C(CH₃)₂-C₆H₃Cl-O-C(O)-]ₙ Cl, n=>40 | ~144 |
| 7 | —C₆H₂(C₂H₅)₂—CH(C₆H₅)—C₆H₂(C₂H₅)₂— | MgF₂ | Chlorobenzene | Cl-C(O)-[O-C₆H₂(C₂H₅)₂-CH(C₆H₅)-C₆H₂(C₂H₅)₂-O-C(O)-]ₙ Cl, n=>25 | ~130 |
| 8 | —(naphthyl)—C(CH₃)(CH₂CH₃)—(naphthyl)— | MgCl₂ | Dichlorobenzene | Cl-C(O)-[O-(naphthyl)-C(CH₃)(CH₂CH₃)-(naphthyl)-O-C(O)-]ₙ Cl, n=>50 | ~180 |

Example 9

An aryl dichloroformate having an average structure corresponding to

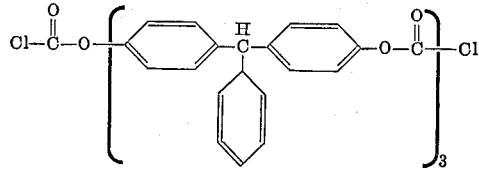

is prepared by charging to a glass reactor equipped with a stirrer 1.2 moles sodium hydroxide, 0.6 mole 2,2-bis(4-hydroxyphenyl)-phenylmethane, 0.9 mole sodium carbonate, 1000 ml. H₂O, and 500 ml. methylene chloride. The resulting mixture is cooled to 0° C. and maintained at this temperature, a solution of 1.25 moles phosgene in 100 ml. methylene chloride is added over a period of five minutes. The reaction mixture is stirred while the temperature is permitted to increase slowly to 25° C. The reaction medium is washed with dilute sulphuric acid, the organic layer removed, and dried over magnesium sulfate. After complete removal of residual sulfuric acid the resulting solution is evaporated, the chloroformate terminated pre-polymer dissolved in 500 ml. chlorobenzene, and the solution is thereafter contacted with an equimolar quantity of MgCl₂ and refluxed. The resulting polymer product is a normally solid high molecular weight polymer having a reduced viscosity value (0.2 gm. polymer/100 ml. CH₂Cl₂ solution at 25° C.) of greater than about 0.5.

What is claimed is:

1. The process for preparing polycarbonate resins which comprises self-condensing at elevated temperatures in the absence of water an aryl dichloroformate as the sole reactive material in the reaction, said aryl dichloroformate having the formula

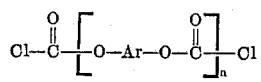

wherein Ar represents a divalent aromatic hydrocarbon radical and $n$ has a value of from 1 to about 15, with a catalytic amount of a magnesium halide as the sole catalyst at a temperature not greater than 250° C.

2. The process according to claim 1 wherein Ar has the formula

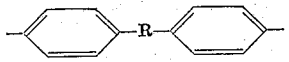

and wherein R represents a divalent alkylidene group in which both phenylene groups are attached to the same carbon atom of the central alkylidene group, and the temperature is from about 50° C. to about 220° C.

3. The process according to claim 2 wherein R has the formula

4. The process according to claim 2 wherein $n$ has a value of 1.

5. The process according to claim 2 wherein the metal halide is magnesium chloride.

6. The process according to claim 2 wherein the metal halide is $MgBr_2$.

7. The process according to claim 2 wherein the metal halide is $MgI_2$.

8. The process according to claim 2 wherein the metal halide is $MgF_2$.

9. The process according to claim 2 wherein from about 50 to about 5000 millimoles of magnesium halide is present per mole of aryl dichloroformate.

10. Process according to claim 9 wherein the reaction is carried out in an inert organic solvent medium.

References Cited by the Examiner

UNITED STATES PATENTS

| | | | |
|---|---|---|---|
| 2,789,965 | 4/1957 | Reynolds et al. | 260—47 X |
| 2,964,797 | 12/1960 | Peilstocker et al. | 260—47 X |
| 3,030,331 | 4/1962 | Goldberg | 260—47 X |
| 3,161,615 | 12/1964 | Goldberg | 260—47 X |
| 3,189,640 | 6/1965 | Dietrich et al. | 260—463 |
| 3,213,061 | 10/1965 | Caldwell et al. | 260—47 X |
| 3,220,976 | 11/1965 | Goldberg | 260—47 X |
| 3,223,677 | 12/1965 | Matzner | 260—47 X |

FOREIGN PATENTS

| | | |
|---|---|---|
| 870,096 | 6/1961 | Great Britain. |
| 1,198,715 | 6/1959 | France. |

WILLIAM H. SHORT, *Primary Examiner.*

LOUISE P. QUAST, *Examiner.*